United States Patent

[11] 3,524,410

[72] Inventors Louis W. Erath
 Houston, Texas;
 Gerald N. Plotkin, Silver Spring, Maryland
[21] Appl. No. 197,962
[22] Filed Nov. 28, 1950
[45] Patented Aug. 18, 1970
[73] Assignee The United States of America as represented by the Secretary of the Navy

[54] OSCILLATOR-DETECTOR DEVICE
 3 Claims, 10 Drawing Figs.
[52] U.S. Cl. ........................................... 102/70.2, 343/5, 343/7
[51] Int. Cl. ........................................... F42c 13/04, G01s 9/02
[50] Field of Search ........................................... 343/5, 7, 10, 12; 102/70.2; 250/36-22.3; 136/90; 336/181, 183; 343/5PD, 7PF

[56] References Cited
UNITED STATES PATENTS
| | | | |
|---|---|---|---|
| 2,911,639 | 11/1959 | Hopkins et al. ............... | 343/7 |
| 2,146,961 | 2/1939 | Lamb ................... 250/36 (22.3)UX |
| 2,168,924 | 8/1939 | Dow .................... 250/36 (22.3)UX |
| 2,279,695 | 4/1942 | Secretan et al. ............... | 343/12 |
| 2,403,567 | 7/1946 | Wales ............................. | 102/70.2X |

FOREIGN PATENTS
585,911 2/1947 Great Britain.

*Primary Examiner*—Richard A. Farley
*Assistant Examiner*—T. H. Tubbesing
*Attorney*—R. S. Sciascia and J. O. Tresansky CLAIM: 1. A proximity fuze for a projectile comprising a firing circuit having an electroresponsive detonator and input terminals and capable of actuating said electroresponsive detonator upon receiving a signal of predetermined character at said input terminals, an oscillator-detector device including an oscillator having a resonant circuit and including a filamented vacuum tube, an antenna system, means coupling said antenna system to said resonant circuit for radiating a portion of the electromagnetic energy generated by said oscillator into space, said oscillator-detector device also including a detector circuit having a filamented rectifier and a load circuit, said detector circuit being connected across said resonant circuit for detecting variations in the resonant voltage thereacross produced when said radiated energy strikes a reflecting object and a reflected portion of said radiated energy is received by said antenna system, and coupling means between said load circuit and said input terminals for applying the detected variations to said firing circuit, said resonant circuit including a bifilar impedance having two sections, one section being connected with the bifilar members in series with the filament of said oscillator, both sections of said impedance being connected to supply a current to the filament of said detector, the filaments of the oscillator and the detector being connected in parallel.

3. An oscillator-detector circuit having at least one vacuum tube in the oscillator circuit and at least one vacuum tube in the detector circuit, each of said tubes having a current heated filament, said oscillator and detector circuits having a resonant impedance in common, said filaments being connected through said resonant impedance with one lead of each filament non-inductively wound with said resonant impedance such that no high frequency current flows through the filament circuit, and an antenna connected to said resonant impedance.

Patented Aug. 18, 1970  3,524,410

INVENTORS.
L. W. ERATH
G. N. PLOTKIN

By G. D. O'Brien
R. M. Hicks  ATTYS.

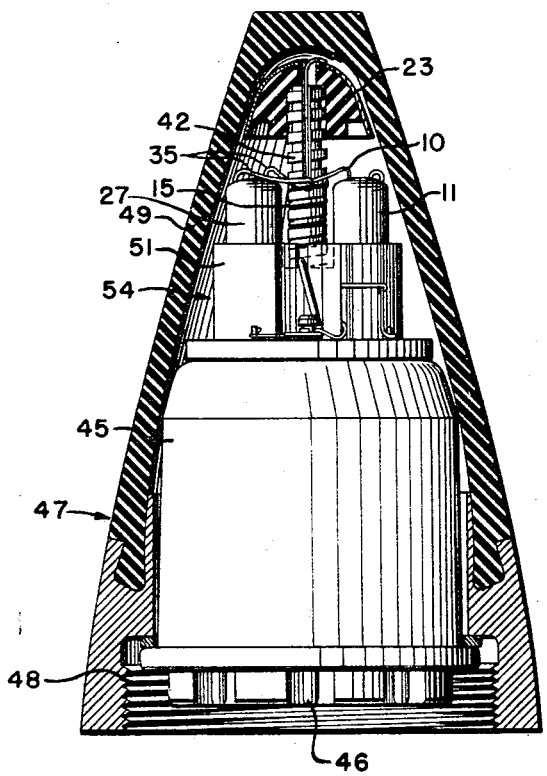
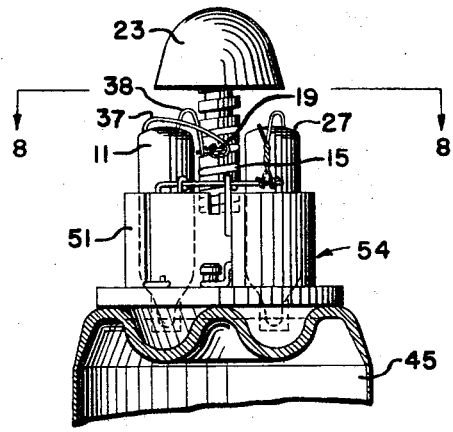
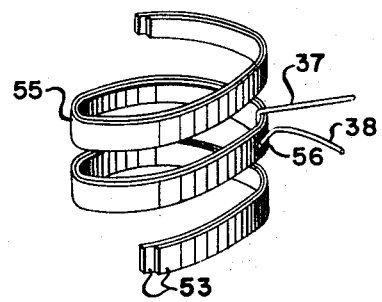
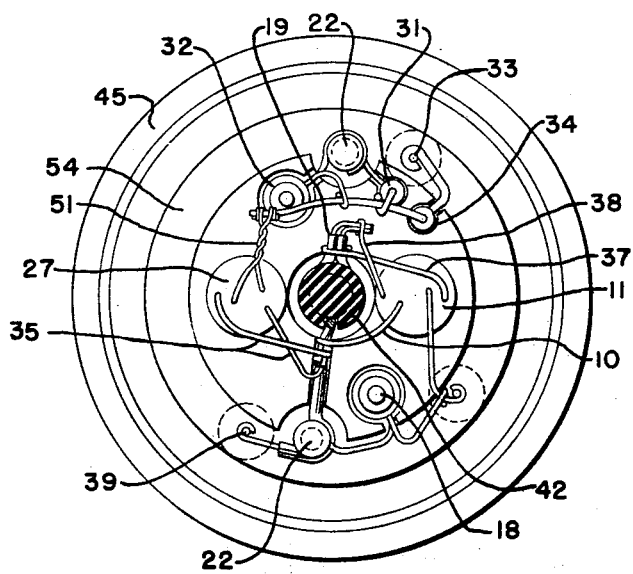
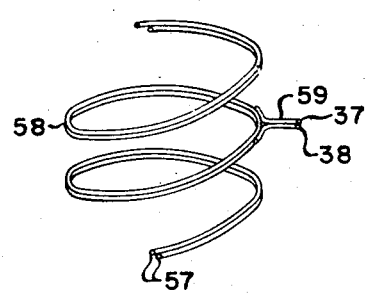
INVENTORS.
L. W. ERATH
BY  G. N. PLOTKIN
ATTYS.

3,524,410

OSCILLATOR-DETECTOR DEVICE

This invention relates generally to a new and improved circuit arrangement useful at ultra high frequencies and more particularly to an improvement in the circuit arrangement of an oscillator-detector device such as that used in the VT fuze. A new feature of the present invention which is of general application in ultra high frequency devices resides in improved means for supplying filament power to the tubes employed in such devices.

In prior ultra high frequency devices which employ a triode oscillator circuit such, for example, as the VT fuze it has been customary to employ a Hartley or Colpitts type circuit. In either of these circuits radio frequency chokes must be employed in the filament circuit to prevent radio frequency currents from flowing through filament supply leads to ground. As the frequency of operation of such devices is increased the problem of obtaining radio frequency chokes suitable for the frequency of operation increases due to the fact that the distributed capacity across an ordinary choke coil resonates the inductance of the coil at what is known as the choke's self resonant frequency. For any frequency above such self resonant frequency the choke acts no longer as an inductance but rather as a capacitance and the magnitude of its reactance rapidly decreases as the frequency increases. This difficulty has lead in the past to the use of the high impedance presented by a short circuited quarter wave length transmission line in place of radio frequency chokes where space considerations do not prohibit the necessarily long linear dimension that a transmission line involves. In addition to chokes in the filament supply of such oscillators a radio frequency choke must be employed in the B supply circuit if shunt feed of the DC voltage is desired. As all resonant chokes and quarter wave length lines are tuned circuits they are essentially single frequency devices and produce widely varying results as the frequency is changed. In addition, a tuned circuit always introduces losses which load the RF circuit and consume a portion of the available power.

The circuit of the present invention overcomes the aforementioned difficulties by providing a novel bifilar conductor tank circuit coil which, when used in a Hartley oscillator circuit, for example, completely eliminates the need for any radio frequency chokes in the filament circuit.

In prior art oscillator detector devices such, for example, as the VT fuze it has heretofore been the practice to employ a single triode tube acting as an oscillator and a plate detector to perform both the function of generating the radio frequency energy which is radiated into space and utilizing the reflected energy received to detect the presence of the reflecting body. The circuit of the present invention separates the function of oscillation and detection by utilizing separate oscillator and detector tubes, thereby permitting the circuit design around each tube to be optimized for its respective function. The addition of a diode for the sole purpose of detection in this circuit is made possible by utilizing the filament supply feature of the bifilar tank coil for the diode filament.

An object of this invention is to provide a new and improved oscillator-detector device.

Another object of this invention is to provide a new and improved oscillator-detector device in which the functions of oscillation and detection have been separated to permit each to be optimized.

A further object of this invention is to provide an oscillator-detector device the sensitivity of which is substantially independent of variations in the parameters of the circuit and can easily be controlled and maintained over a wide range of operating conditions.

A further object of this invention is to provide a new and improved tank coil useful in supplying filament power to tubes operating at a high radio frequency.

A further object of this invention is to provide for the elimination of radio frequency chokes in a device through the use of a new and improved tank coil and circuit arrangements which are employed to supply filament power to the tubes in the device.

Another object of this invention is to provide a new and improved oscillator-detector device in which all radio frequency chokes have been eliminated and the oscillator and detector functions thereof separated through the use of a new and improved tank coil and circuit arrangements therefor which are employed to supply filament power to the tubes in the device and provide the coupling means between the oscillator and detector portions of the device.

An additional object of this invention resides in providing a unitary inductance that comprises a plurality of conductive paths.

Another object of this invention is to provide a new and improved oscillator-detector device which reduces the physical volume of the assembled circuit.

A further object of this invention is the provision of a new and improved tank coil and circuit arrangement for an oscillator-detector which is simple and reliable in operation and economical to manufacture.

Other objects and many of the attendant advantages of this invention will be readily appreciated as the same becomes better understood by reference to the following detailed description when considered in connection with the accompanying drawings wherein:

FIG. 6 is an elevation of a VT fuze partly in section in which the circuit of the present invention has been employed, showing the diode filament supply leads emanating from the oscillator grid end of the tank coil;

FIG. 7 is a fragmentary elevation of the VT fuze of FIG. 6 and from the reverse side thereof, partly in section and showing the filament leads of the oscillator tube connected to the midpoint of the oscillator tank coil;

FIG. 8 is a plan view on a slightly enlarged scale and partly in section taken on the line 8-8 of FIG. 7 and rotated 180°;

FIG. 9 is a view showing an alternative construction of a bifilar coil winding in which the conductors are composed of straps; and FIG. 10 is a view in which the bifilar coil winding comprises a pair of wires.

In this specification the term "bifilar" or "bifilar conductor" is used to designate two or more conductively insulated conductors, which are substantially parallel to each other along their length, and which have a distributed capacitance and an electromagnetic coupling therebetween along their length sufficient to permit them to act as a unitary conductor at the radio frequency at which they operate.

Figure 2:
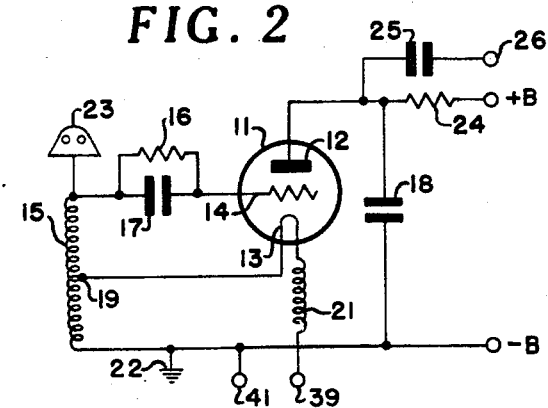
FIG. 2 is a diagrammatic view of a conventional Hartley oscillator-detector circuit as employed in prior art oscillator-detector devices.

Referring now to the drawings wherein like characters of reference refer to like parts throughout the several views and more particularly to FIG. 2 thereof, there is shown the triode vacuum tube 11 having plate 12 and filament 13 and grid 14 connected in a conventional Hartley oscillator circuit. The oscillator circuit comprises tank coil 15 one end of which is connected to grid 14 by means of the biasing combination of resistor 16 and capacitor 17, and the other end of which is connected to plate 12 through the RF by-pass capacitor 18. The filament 13 is connected to a tap point 19 on the tank coil intermediate the ends thereof. The A supply voltage for heating filament 13 is supplied thereto through the DC path comprising the radio frequency choke 21 connected to one side of filament 13 and the DC path through the lower portion or section of coil 15 to tap 19 connected to the other side of filament 13. In this manner it is apparent that the filament can be supplied with a DC voltage at terminals 39 and 41 for heating it to operating temperature, while the radio frequency potential of the filament is determined solely by the potential of tap 19 because radio frequency choke 21 isolates the RF potential on filament 13 from the A supply. Such a circuit will oscillate at a frequency determined by the resonant frequency of coil 15 in combination with the interelectrode capacitances of tube 11.

The circuit of FIG. 2 is used as an oscillator-detector device in the VT fuze by connecting one end of coil 15 to the projectile case which acts as a ground 22 and the other end of coil 15 is connected to an antenna element 23 located in the nose of the projectile. The projectile in flight, therefore, operates as an antenna system for the oscillator and the radio frequency energy generated by the oscillator is radiated by the antenna system into space. If the projectile is in the vicinity of a reflecting object a portion of the radiated energy will be reflected back to the projectile and received by the projectile antenna system. The energy received by the antenna system of the projectile will appear as a small voltage in the resonant circuit 15 of the oscillator and the frequency of this received voltage will differ from the frequency of oscillation of the oscillator due to the relative motion between the projectile and the reflecting object. The frequency difference between the generated voltage and the received voltage produces a fluctuation in the plate current of tube 11 which varies at a rate equal to the difference in these two frequencies. The DC plate voltage for tube 11 is supplied to plate 12 through resistor 24 and the fluctuations in plate current due to the reflected signals will appear as a voltage across this resistor. The circuit therefore is acting not only as an oscillator but is acting as a plate detector for detecting the return of energy reflected from a reflector in the vicinity of the moving projectile. A conventional coupling capacitor 25 connected to plate 12 can be used to obtain the variation in voltage across resistor 24 as an AC output signal at terminal 26. The signal appearing at terminal 26 can be amplified by conventional means and supplied to a firing circuit such, for example, as that disclosed and claimed in the copending application of Lawrence Fleming for an Actuation Level Control Circuit for an Electro-responsive Device, Ser. No. 167635, filed June 12, 1950, now U.S. Patent No. 3,133,229 which will be actuated when the strength of the signal is sufficient to indicate that the projectile is within the effective destructive range of the projectile.

In practice the operation of the circuit as hereinbefore set forth has certain disadvantages due to the fact that when the circuit is adjusted to produce the maximum power output as an oscillator it functions inefficiently as a plate detector and when it is adjusted to operate most efficiently as a plate detector the operation as an oscillator produces a relatively small power output. The sensitivity of the oscillator-detector device, which is a product of these two factors, thus has its maximum value at a point which compromises power output and detector efficiency.

Figure 3:
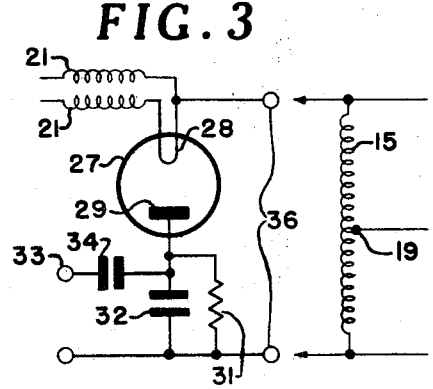
FIG. 3 is a diagrammatic view of a diode detector circuit as it could be added to the circuit of FIG. 2 to permit separation of the functions of oscillation and detection.

Referring now to FIG. 3 a rectifier circuit comprising diode 27 having filament 28 and plate 29 and a plate load comprising resistor 31 and capacitor 32 is adapted for connection across tank coil 15 at terminals 36. The filament power is supplied to diode filament 28 through two radio frequency chokes 21. Such a circuit will rectify the voltage appearing across coil 15 and any variations in that voltage can be made to appear as an AC output voltage at terminal 33 by means of coupling condenser 34 if the values of resistor 31 and condenser 32 are properly selected. Of course, any conventional coupling means such, for example, as an RC filter may be employed in place of capacitor 34. By connecting the diode circuit terminals 36 across the tank coil 15 of the circuit of FIG. 2 a means is provided for separating the oscillator and detector functions. In such a circuit the oscillator can be adjusted for optimum operating range or sensitivity and the diode detector circuit will provide a detector of maximum sensitivity for the voltage across the coil 15 produced by the receipt of reflected energy. This combination of the circuits of FIGS. 2 and 3, therefore, provides a novel means of separating the oscillator and detector functions in an oscillator-detector device with the aforementioned advantages over the oscillator-detector circuit of FIG. 2 above. Of course, in this combination of the circuits of FIGS. 2 and 3 resistor 24 and capacitor 25 are no longer required and the B+ voltage can be directly connected to plate 12. In this manner tube 11 will operate at the full available supply voltage and thus provide the maximum operating range for a given B+ supply voltage and oscillator circuit. While the advantages obtained with such a circuit are desirable in some applications the attendant disadvantages due to the difficulties encountered in the additional radio frequency chokes employed may prevent the use of this circuit combination. Of course, the chokes 21 may be eliminated by the provision of an isolated filament voltage power supply such, for example, as a floating battery but the attendant disadvantages of such an arrangement are at least as great as that encountered through the use of the additional chokes.

Figure 1:
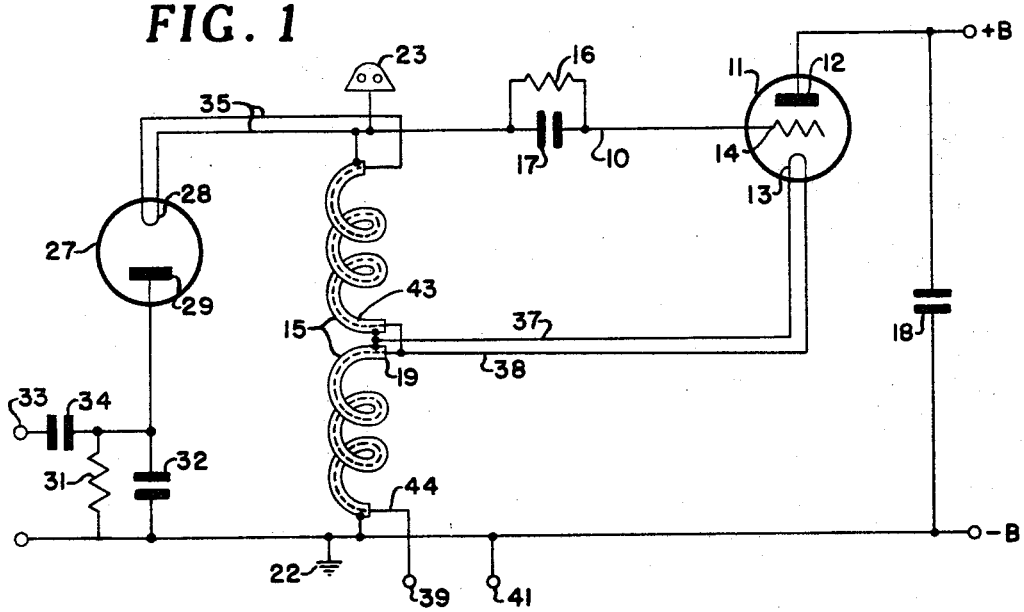
FIG. 1 is a diagrammatic view of the preferred embodiment of the oscillator-detector circuit of the present invention employing a bifilar conductor tank coil.

Referring now to FIG. 1 there is shown the circuit of the present invention according to a preferred embodiment thereof in which the oscillator and the detector functions have been separated between the triode oscillator tube and diode detector tube and in which a novel bifilar tank coil has been incorporated which permits supplying the filament power to both tubes thereby completely eliminating all radio frequency chokes from the circuit. As hereinbefore described, oscillator tube 11 comprising a plate 12, filament 13 and grid 14 is connected in a Hartley oscillator circuit by connecting one end of tank coil 15 to grid 14 by means of resistor 16 and capacitor 17 and the other end of tank coil 15 to plate 12 by means of capacitor 18. The filament 13 is connected to the tank coil 15 at a point 19 intermediate the ends thereof to complete the oscillatory circuit. The tank coil 15 no longer is wound from a single conductor but rather is wound with two conductors which are conductively insulated one from the other but which are physically disposed in such close spatial relationship that the distributed capacitance and electromagnetic coupling between the two conductors along their length is high.

Such a bifilar conductor for winding the coil can preferably be constructed by inserting an enamel or formex insulated solid wire within a tube, the inner diameter of which is just large enough to permit the insulated wire to pass therethrough with small clearance therebetween. Due to the high capacitance between the conductors at each point along the coil, corresponding points on each conductor at a given position along the coil will be at the same radio frequency potential. Such an arrangement is well adapted for supplying filament power to tube 11 by connecting the positive A supply voltage to the terminal 39 which is connected to the inner conductor 44 of the coaxial coil arrangement, brought out of the coil tubing 43 at the point 19, and connected to the positive side of filament 13 by means of conductor 38. The negative side of filament 13 is connected by conductor 37 to the tubing or outer conductor of the coaxial coil arrangement at tap 19 to complete the circuit through the lower portion of the coil tubing to ground and the negative A terminal 41.

Thus it will be apparent that while the filament power to filament 13 is supplied by two insulated conductors, the filament itself operates at the RF potential of the tap 19 since both conductors 37 and 38 are at the RF potential of tap 19 due to the high capacitance between the coaxially arranged conductors comprising the tank coil.

In like manner, the filament power to filament 28 of tube 27 is supplied by the conductively insulated pair of conductors comprising the top portion or section of coil 15 thereby connecting filament 28 in parallel with the filament 13 with respect to the A supply voltage. The RF potential of filament 28, however, is the same as that of the grid end of coil 15 and therefore this filament operates at the full RF potential across coil 15 with respect to ground. The diode 27, therefore, will operate to rectify the RF voltage across coil 15 and detect any variation therein as described in connection with FIG. 3 with the important advantage thereover in that both filament chokes 21 have been eliminated and the difficulties inherent in obtaining satisfactory operation of radio frequency chokes at ultra high frequencies have been eliminated. The choke from one side of filament 13 of tube 11 to a positive A supply has likewise been eliminated with its attendant advantages by this circuit. By maintaining both sides of the filaments of the tubes at the RF potentials at which they are to operate as cathodes, or sources of electrons, in this circuit all possible paths through which a circulating RF current could flow through filaments have been eliminated as have all shunt paths to ground and these desirable results have been achieved without having to rely upon the efficacy of any radio frequency chokes.

Further advantages, as hereinafter set forth, can be realized in the improved oscillator-detector circuit of which FIG. 1 is the preferred embodiment. Since the oscillator tube 11 no longer needs to function as a detector, resistor 24 of FIG. 2 has not been incorporated in the lead connecting the positive B supply voltage to the plate 12 of the tube. Thus tube 11 of FIG. 1 operates at the full available B supply voltage and the resultant operating range is thereby increased. Since the strict requirements of proper bias for plate detection are no longer imposed on tube 11 the bias combination of resistor 16 and capacitor 17 may be eliminated, if desired, and the upper end of coil 15 may be directly connected conductively to grid 14 thereby providing satisfactory operation with a saving of two components. Since all shunt paths to ground from points in the circuit which are above ground in RF potential have been eliminated the losses attendant upon such paths have been eliminated and the radio frequency power and voltage in the resonant circuits will be a maximum. The diode detector 27 across the resonant circuit 15 provides a substantially infinite impedance detector and thereby produces no loading on the resonant circuit. The overall sensitivity and stable operating range of the oscillator-detector device can be readily controlled by controlling the operating point of the oscillator which, in the circuit of the present invention, can be controlled independently of the detector efficiency.

Figure 4:
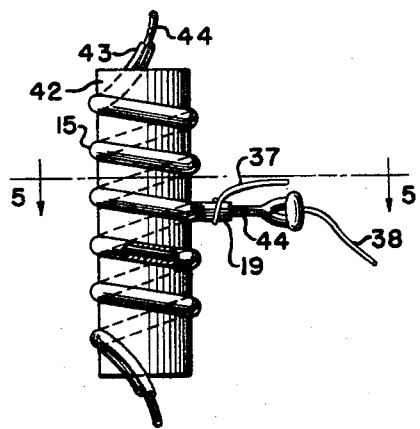
FIG. 4 is a view of the novel inductance of the present invention wherein the bifilar winding comprises two coaxial conductors.
Figure 5:
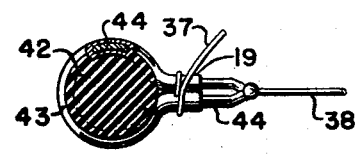
FIG. 5 is a sectional view taken along the line 5-5 of FIG. 4.

Referring now to FIG. 4 there is shown a preferred embodiment of the novel construction of the bifilar tank coil of the present invention which provides predominantly electrostatic coupling. Any suitable coil form 42 may be used, if desired, upon which is wound the coil 15. The conductor used to wind coil 15 comprises a tubular member 43 which for ultra high frequency purposes may conveniently be silver plated if desired. Disposed within tubular member 43 throughout its length is a conductor 44 which is in close physical relation with the inner wall of tubing 43 but conductively insulated therefrom in any suitable manner such, for example, as providing conductor 44 with a thin coating of enamel or formex insulation in a manner that is well known in the art. A tap 19 intermediate the ends of the coil can conveniently be obtained by providing an opening in the tubing at the desired point through which the inner conductor 44 can pass. In this manner two conductively isolated leads 37 and 38 can be obtained from the tap 19 which are at the same radio frequency potential.

Referring now to FIG. 6 there is shown the circuit of the present invention as embodied in the VT fuze wherein the oscillator-detector assembly generally designated 54 is mounted upon an amplifier and firing circuit assembly 45. Pin type connectors 46 are provided in the base of assembly 45 for connection to a suitable source of power such, for example, as a battery. A VT fuze circuit comprising oscillator-detector assembly 54 and amplifier-firing circuit assembly 45 is adapted to be mounted on the front end of a projectile and held in place by the front case generally designated 47 comprising a threaded portion 48 for engaging threads secured to the projectile and a dielectric portion 49 for enclosing the radio frequency portions of the fuze assembly. The tubes 11 and 27 are positioned in a suitable receptacle 51 which forms a rugged mechanical base support for the components and for coil form 42 which in turn forms the support for the antenna cap 23. The filament leads 35 of diode 27 are connected respectively to the two conductors 43 and 44 at the upper end of coil 15 and the grid lead 10 of tube 11 is connected to the tubular conductor 43.

Referring now to FIG. 7 there is shown the oscillator-detector assembly 54 and a fragmentary view partly in section of the firing circuit assembly 45. The filament of tube 11 is connected by leads 37 and 38 to the inner and outer conductors 43 and 44 respectively at tap 19.

Referring now to FIG. 8, a plan view of the circuit component layout for the oscillator-detector assembly of FIGS. 6 and 7 is shown. Diode tube 27 can conveniently be obtained by using a triode tube and connecting together the grid and plate leads thereof as shown at 51.

Referring now to FIG. 9 there is shown an alternative construction of the bifilar tank coil winding in which straps 53 of conductive material have been adjacently disposed and wound in form of a coil 55. The straps are conductively isolated from one another by interposing a layer of insulation therebetween or more conveniently employing at least one strap which has an enamel or formex insulating coating thereon. The tap 56 can be obtained, for example, by connecting the leads 37 and 38 to the exposed faces of the straps respectively adjacent the tap point 56.

Referring now to FIG. 10 a still further alternative construction of the bifilar coil winding is shown which comprises two adjacent wire conductors 57 which are wound to form the coil 58 and to which the leads 37 and 38 are connected to form the tap 59. Insulation between the conductors 57 can conveniently be obtained by using one conductor having an enamel or formex insulating coating thereon. The constructions shown in FIGS. 9 and 10 provide a combination of electrostatic and electromagnetic coupling between the conductors to produce an effectively unitary conductor.

The operation of the circuit of this invention will now be described with reference to FIG. 1. When the projectile is fired the initial setback can be employed to supply operative voltage from a battery to the filament and plate circuit of the oscillator tube 11 and to the filament circuit of the diode detector 27. Operative voltages are also applied to the tubes in the amplifier and firing circuit assembly. As the projectile proceeds along its trajectory the oscillations of tube 11 produce a radio frequency potential across coil 15 which is coupled to the antenna system formed by the antenna cap 23 and the projectile body represented by ground at 22 in FIG. 1. This antenna system radiates electromagnetic energy into space in a predetermined pattern. If a reflecting object such, for example, as a target aircraft comes within the pattern of the radiated energy a portion of that energy striking the reflector will be reflected back to the antenna system of the projectile which will receive the energy and produce a voltage therefrom in coil 15. The voltage induced by the reflected energy will be of slightly different frequency than the frequency of oscillations generated by tube 11 due to the relative motion between the projectile and reflector. The presence of this voltage will cause the radio frequency potential across resonant circuit 15 to vary at a rate corresponding to the difference in frequency between the frequency of the oscillator and the frequency of the received energy and the magnitude of this variation will depend upon the proximity of the reflecting object. The diode detector circuit comprising tube 27, resistor 31 and capacitor 32 will detect this variation in RF potential across coil 15. By means of coupling condenser 34 this detected variation appears at terminal 33 as an AC output voltage the magnitude of which is a measure of the proximity of the reflecting object. The input to the amplifier in the amplifier firing circuit assembly 45 of FIG. 6 is connected to terminal 33 and the AC voltage there existing is amplified by the amplifier having a predetermined gain. The firing circuit of assembly 45 can be adapted to provide a detonating current when the amplified voltage output of the amplifier reaches a predetermined amplitude. When the reflecting object is near enough to the projectile to produce a predetermined voltage variation in resonant circuit 15 the detected and amplified voltage variation will be sufficient to actuate the firing circuit to supply the firing current to a detonator and thus detonate the projectile.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

We claim:

1. A proximity fuze for a projectile comprising a firing circuit having an electroresponsive detonator and input terminals and capable of actuating said electroresponsive detonator upon receiving a signal of predetermined character at said input terminals, an oscillator-detector device including an oscillator having a resonant circuit and including a filamented vacuum tube, an antenna system, means coupling said antenna system to said resonant circuit for radiating a portion of the electromagnetic energy generated by said oscillator into space, said oscillator-detector device also including a detector circuit having a filamented rectifier and a load circuit, said detector circuit being connected across said resonant circuit for detecting variations in the resonant voltage thereacross produced when said radiated energy strikes a reflecting object and a reflected portion of said radiated energy is received by said antenna system, and coupling means between said load circuit and said input terminals for applying the detected variations to said firing circuit, said resonant circuit including a bifilar impedance having two sections, one section being connected with the bifilar members in series with the filament of said oscillator, both sections of said impedance being connected to supply a current to the filament of said detector, the filaments of the oscillator and the detector being connected in parallel.

2. An oscillator-detector comprising a grid controlled discharge device having a plate adapted to be connected to a source of high potential, a grid, and a thermionic electron emitter means adapted to be heated by the flow of an electric current, a resonant impedance comprising two connected sections, a first means connecting the plate across one of said sections, a second means connecting said grid across the other of said sections, a second discharge device comprising a therminoic electron emitter means adapted to be heated by the flow of an electric current, and a plate, said second discharge device being connected across both sections of said resonant impedance, said resonant impedance being of bifilar construction, a heating current path for both discharge devices comprising said resonant impedance non-inductively connected between a source of current and both thermionic emitter means, and an antenna connected to the electron emitting circuit of said second discharge device.

3. An oscillator-detector circuit having at least one vacuum tube in the oscillator circuit and at least one vacuum tube in the detector circuit, each of said tubes having a current heated filament, said oscillator and detector circuits having a resonant impedance in common, said filaments being connected through said resonant impedance with one lead of each filament non-inductively wound with said resonant impedance such that no high frequency current flows through the filament circuit, and an antenna connected to said resonant impedance.